United States Patent
Bezer et al.

(10) Patent No.: US 11,306,174 B2
(45) Date of Patent: Apr. 19, 2022

(54) CURABLE FILM-FORMING COMPOSITIONS DEMONSTRATING DECREASED CURE TIME WITH STABLE POT LIFE

(71) Applicant: PPG Industries Ohio, Inc., Cleveland, OH (US)

(72) Inventors: Silvia Bezer, Gibsonia, PA (US); Steven R. Zawacky, Cranberry Township, PA (US); Diane Schillinger, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 188 days.

(21) Appl. No.: 16/611,763

(22) PCT Filed: Mar. 1, 2018

(86) PCT No.: PCT/US2018/020482
§ 371 (c)(1),
(2) Date: Nov. 7, 2019

(87) PCT Pub. No.: WO2018/208364
PCT Pub. Date: Nov. 15, 2018

(65) Prior Publication Data
US 2020/0095365 A1 Mar. 26, 2020

Related U.S. Application Data

(60) Provisional application No. 62/502,965, filed on May 8, 2017.

(51) Int. Cl.
*C08G 18/16* (2006.01)
*C09D 175/06* (2006.01)

(52) U.S. Cl.
CPC .......... *C08G 18/161* (2013.01); *C09D 175/06* (2013.01)

(58) Field of Classification Search
None
See application file for complete search history.

(56) References Cited

U.S. PATENT DOCUMENTS

| | | | |
|---|---|---|---|
| 4,018,636 A | 4/1977 | O'Neill et al. | |
| 4,359,359 A | 11/1982 | Gerlach et al. | |
| 5,733,945 A | 3/1998 | Simpson | |
| 5,846,897 A | 12/1998 | Blank et al. | |
| 6,130,286 A | 10/2000 | Thomas et al. | |
| 7,001,864 B2 | 2/2006 | Kiso et al. | |
| 2006/0058454 A1 | 3/2006 | Licht et al. | |
| 2006/0155053 A1* | 7/2006 | Lenges ................ | C09D 175/12 524/589 |
| 2010/0285234 A1 | 11/2010 | Van Den Berg et al. | |
| 2015/0022694 A1 | 1/2015 | Jang et al. | |
| 2015/0037577 A1 | 2/2015 | Kataoka et al. | |
| 2015/0191565 A1 | 7/2015 | Takahashi | |
| 2015/0225605 A1 | 8/2015 | Steinbrecher et al. | |

FOREIGN PATENT DOCUMENTS

| | | |
|---|---|---|
| CN | 104479103 A | 4/2015 |
| CN | 107118604 A | 9/2017 |
| EP | 1163956 A1 | 12/2001 |
| WO | 2020096598 A1 | 5/2020 |

OTHER PUBLICATIONS

De Lima et al., "Kinetic Study of Polyurethane Synthesis Using Different Catalytic Systems of Fe, Cu, Sn, and Cr", Journal of Applied Polymer Science, vol. 115, 1797-1802 (2010).
He et al., "A Selective Catalyst for Two Component Waterborne Polyurethane Coatings", International Waterborne, High-Solids, and Powder Coatings Symposium, Feb. 10-12, 1999, New Orleans, LA, USA.
Ligabue et al., "Catalytic properties of Fe(acac)3 and Cu(acac)2 in the formation of urethane from a diisocyanate derivative and EtOH", Journal of Molecular Catalysis A: Chemical 130 (1998), pp. 101-105.
Ligabue et al., "Influence of teh alcohol nature on the Catalytic properties of Fe(acac)3 and Cu(acac)2 in the formation of urethane from a diisocyanate", Journal of Molecular Catalysis A: Chemical 157 (2000), pp. 73-78.
Pengfei Yang et al., "Catalytic Kinetics and Mechanism Transformation of Fe(acac)3 on the Urethane Reaction of 1,2-Propanediol with Phenyl Isocyanate", International Journal of Chemical Kinetics, Oct. 2013.
Stamenkovic et al., "Catalysis of the Isocyanate-Hidroxyl Reaction By Non-Tin Catalysts in Water Borne Two Component Polyurethane Coatings", Working and Living Environmental Protection vol. 2, No. 4, 2004, pp. 243-250.
Xiaodeng Yang et al., "Ferric Acetylacetonate Catalyst on the Urethane Reaction of Phenyl Isocyanate and 1,2-Propyleneglycol: A Study of Kinetics, Thermodynamics, and Mechanism with In Situ FT-IR Spectroscopy", International Journal of Polymer Analysis and Characterization, Apr. 2013.

* cited by examiner

*Primary Examiner* — Jeffrey D Washville
(74) *Attorney, Agent, or Firm* — Krisanne Shideler

(57) ABSTRACT

The present invention is directed to an aqueous curable film-forming composition comprising: (a) a film-forming component comprising an aliphatic di- or higher functional polyisocyanate; and (b) a catalyst additive comprising: (i) a catalytic organic compound comprising iron and/or tin; and (ii) a beta-diketone. The present invention is further directed to a method of controlling the rate of cure of an aqueous curable film-forming composition. The method comprises adding to the aqueous curable film-forming composition the catalyst additive described above; the aqueous curable film-forming composition comprises a film-forming component comprising an aliphatic di- or higher functional polyisocyanate. The present invention is additionally directed to a coated article comprising a cured coating layer applied on at least one surface of a substrate to form a coated substrate; wherein the cured coating layer is deposited from the aqueous curable film-forming composition described above.

25 Claims, No Drawings

CURABLE FILM-FORMING COMPOSITIONS DEMONSTRATING DECREASED CURE TIME WITH STABLE POT LIFE

CROSS-REFERENCE TO RELATED APPLICATION

This application claims priority to provisional U.S. Patent Application Ser. No. 62/502,965, filed May 8, 2017, and entitled "CURABLE FILM-FORMING COMPOSITIONS DEMONSTRATING DECREASED CURE TIME WITH STABLE POT LIFE", which is incorporated herein by reference in its entirety.

STATEMENT REGARDING FEDERALLY SPONSORED RESEARCH OR DEVELOPMENT

This invention was developed with support by the United States Government under contract number W911NF-14-2-0078 awarded by the U.S. Army Research Laboratory (ARL). The United States Government may have certain rights in the invention.

FIELD OF THE INVENTION

The present invention relates to aqueous curable film-forming compositions, coated articles, and methods of controlling the rate of cure of curable film-forming compositions.

BACKGROUND OF THE INVENTION

The addition of catalysts to a coating cured with polyisocyanates can accelerate the drying process by promoting cure. Certain metal complex compounds catalyze the reaction between active hydrogen compounds or water and isocyanate-containing compounds to produce polyurethane polymers. However, the addition of certain metal complex catalysts to waterborne compositions carries the risk of instability or insolubility of the catalyst in the aqueous medium. Additionally, too active a catalyst can cause viscosity of the waterborne paint composition to increase too quickly for consistent spray application. Performance of the coating at the end of its pot life may also be different from that of the freshly mixed paint and sometimes coatings cannot meet specification requirements such as adhesion, chemical resistance and appearance. If the pot life is too short, the performance and appearance of the coating on one area of the substrate could be unacceptably different from another area. Therefore, along with an accelerated cure, methods for maintaining or extending the pot life upon catalyst additions are very critical to be implemented. In this context, addition of volatile chelating agents to the formulation can stabilize and inhibit the catalyst in the waterborne paint so as to maintain pot life but allow activation of catalyst upon paint application through its evaporation and thus accelerate cure.

It is desirable to provide an aqueous polyisocyanate-cured coating system that has a stable pot life but that cures quickly upon application to a substrate.

SUMMARY OF THE INVENTION

The present invention is directed to an aqueous curable film-forming composition comprising:
  (a) a film-forming component comprising an aliphatic di- or higher functional polyisocyanate; and
  (b) a catalyst additive comprising:
    (i) a catalytic organic compound comprising iron and/or tin; and
    (ii) a beta-diketone.

The present invention is further directed to a method of controlling the rate of cure of an aqueous curable film-forming composition. The method comprises adding to the aqueous curable film-forming composition a catalyst additive comprising:
  (i) a catalytic organic compound comprising iron and/or tin; and
  (ii) a beta-diketone. The aqueous curable film-forming composition comprises a film-forming component comprising an aliphatic di- or higher functional polyisocyanate.

The present invention is additionally directed to a coated article comprising:
  (A) a substrate having at least one coatable surface; and
  (B) a cured coating layer applied on at least one surface of the substrate to form a coated substrate; wherein the cured coating layer is deposited from the aqueous curable film-forming composition described above.

DETAILED DESCRIPTION OF THE INVENTION

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used in this specification and the appended claims, the articles "a," "an," and "the" include plural referents unless expressly and unequivocally limited to one referent.

The film-forming component (a) used in the curable film-forming composition may be selected from one or more aliphatic di- or higher functional polyisocyanates. Aliphatic polyisocyanates are typically more compatible (e. g., more miscible) with an aqueous medium than aromatic polyisocyanates. Diisocyanates include 4,4'-methylene-bis(cyclohexyl isocyanate), isophorone diisocyanate, an isomeric mixture of 2,2,4- and 2,4,4-trimethyl hexamethylene diisocyanate, and/or 1,6-hexamethylene diisocyanate. Biurets of any suitable diisocyanate including 1,4-tetramethylene diisocyanate and 1,6-hexamethylene diisocyanate may be used.

Also, biurets of cycloaliphatic diisocyanates such as isophorone diisocyanate and 4,4'-methylene-bis-(cyclohexyl isocyanate) can be employed.

In certain examples of the present invention the polyisocyanate comprises a tri- or higher functional polyisocyanate, which are particularly suitable for the preparation of CARCs (Chemical Agent Resistant Coatings). CARCs are usually employed for aircraft and military vehicles because they have excellent chemical resistance, durability, low temperature flexibility, and heat stability. CARCs are commonly applied to military equipment, vehicles, and aircrafts that can be exposed to chemical and biological agents. Chemical agent resistant coatings resist biological and chemical agents. After being exposed to biological and chemical agents, biological and chemical agents may then be washed from the surface of the coatings during a decontamination process. As such, chemical agent resistant coatings are also designed to resist damage from decontamination wash solutions. Suitable trifunctional isocyanates may include trimers of diisocyanates such as isophorone diisocyanate and hexamethylene diisocyanate, triisocyanato nonane, triphenylmethane triisocyanate, and DESMODUR N 3300, which is the isocyanurate of hexamethylene diisocyanate, available from Covestro AG.

The polyisocyanate may also be one or more of those disclosed above, chain extended with one or more polyamines and/or polyols using suitable materials and techniques known to those skilled in the art to form a polyurethane prepolymer having isocyanate functional groups.

The polyisocyanate may comprise a mixture of one or more diisocyanates and one or more higher polyisocyanates.

The polyisocyanate may be present in the curable film-forming composition at 100 percent by weight, based on the total weight of resin solids in the composition. In this scenario, the curable film-forming composition is essentially free of any additional film-forming compounds described below. By "essentially free" of a material is meant that a composition has only trace or incidental amounts of a given material, and that the material is not present in an amount sufficient to affect any properties of the composition. These materials are not essential to the composition and hence the composition is free of these materials in any appreciable or essential amount. If they are present, it is in incidental amounts only, typically less than 0.1 percent by weight, based on the total weight of solids in the composition.

The term "curable", as used for example in connection with a curable composition, means that the indicated composition is polymerizable or cross linkable through functional groups, e.g., by means that include, but are not limited to, thermal (including ambient cure) and/or catalytic exposure.

The term "cure", "cured" or similar terms, as used in connection with a cured or curable composition, e.g., a "cured composition" of some specific description, means that at least a portion of the polymerizable and/or crosslinkable components that form the curable composition is polymerized and/or crosslinked. Additionally, curing of a polymerizable composition refers to subjecting said composition to curing conditions such as but not limited to thermal curing, leading to the reaction of the reactive functional groups of the composition, and resulting in polymerization and formation of a polymerizate. When a polymerizable composition is subjected to curing conditions, following polymerization and after reaction of most of the reactive end groups occurs, the rate of reaction of the remaining unreacted reactive end groups becomes progressively slower. The polymerizable composition can be subjected to curing conditions until it is at least partially cured. The term "at least partially cured" means subjecting the polymerizable composition to curing conditions, wherein reaction of at least a portion of the reactive groups of the composition occurs, to form a polymerizate. The polymerizable composition can also be subjected to curing conditions such that a substantially complete cure is attained and wherein further curing results in no significant further improvement in polymer properties, such as hardness.

The curable film-forming composition of the present invention further comprises (b) a catalyst additive. The catalyst additive in turn comprises (i) a catalytic organic compound comprising iron and/or tin; and (ii) a beta-diketone. Suitable iron-containing compounds include ferric acetylacetonate. Exemplary tin compounds include Dibutyltin dioctoate, Dibutyltin dilaurate (DBTDL), Dibutyltin diacetate (DBTA), Dibutyltin sulphide (DBTS), Dibutyltin maleate (DBTM), Dibutyltin-2-ethylhexanoate (DBTEH), Dibutyltin-dineodecanoate (DBTND), Dibutyltin dichloride (DBTCl), Dibutyltin oxide (DBTO), Monobutyltin trichloride (MBTCl), Monobutyltin oxide (MBTO), Dioctyltin dilaurate (DOTL), Dioctyltin diacetate (DOTA), Dioctyltin sulphide (DOTS), Dioctyltin maleate (DOTM), Dioctyltin-2-ethylhexanoate (DOTEH), Dioctyltin-dineodecanoate (DOTND), Dioctyltin dichloride (DOTCl), Dioctyltin oxide (DOTO), Monooctyltin trichloride (MOTCl), and Monooctyltin oxide (MOTO). Often, the catalytic organic compound (i) comprises ferric acetylacetonate and/or dibutyltin dilaurate.

The catalytic organic compound (i) is present in the curable film-forming composition in an amount ranging from at least 0.10 percent by weight, such as at least 0.22 percent by weight, to at most to 0.8 percent by weight, such as at most 0.66 percent by weight, based on the total weight of resin solids in the composition. The amounts of the catalytic organic compound strongly depend on the NCO:OH index (i. e., equivalent ratio), resin structure and type of catalytic organic compound.

The use of the catalyst additive (b) is unique to the aqueous curable film-forming compositions of the present invention for several reasons. As noted earlier, the addition of catalysts such as the catalytic organic compound (i) to curable waterborne compositions carries the risk of hydrolysis or insolubility of the catalyst in the aqueous medium. The catalytic organic compound (i) may be stabilized and solubilized in the curable film-forming composition of the present invention by the addition of a beta-diketone. Moreover, water participates in various chemical reactions in the aqueous composition of the present invention, forming unique functional groups in the reaction products, such that the products in the cured composition are different from those that would result in a solventborne composition.

The catalyst additive further comprises (ii) a beta-diketone. Such beta-diketones typically include aliphatic beta-diketones.

Examples of suitable aliphatic, hindered diketones are as follows:

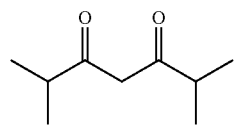

I

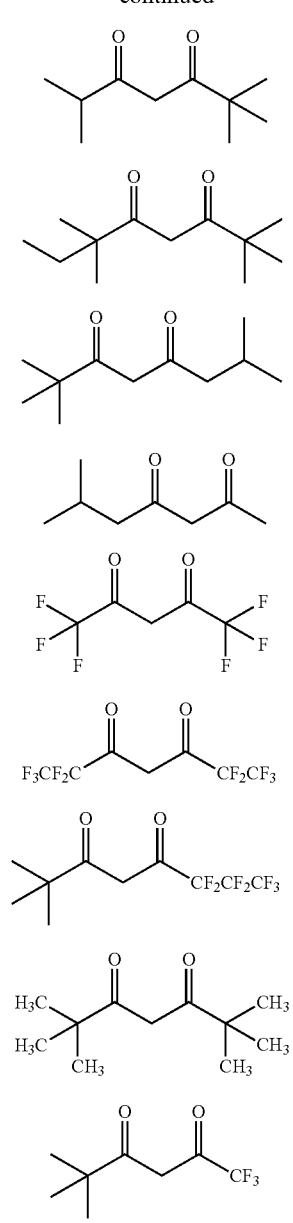

Other beta-diketones typically include aliphatic beta-diketones such as 2,4-pentanedione and/or 3-methyl-2,4-pentanedione.

The beta-diketone (ii) is present in the film-forming compositions in an amount ranging from at least 4 percent by weight, such as at least 6 percent by weight, to at most 50 percent by weight, such as at most 30 percent by weight, based on the total weight of resin solids in the composition. The amount of beta-diketone (ii) strongly depends on the NCO:OH index, resin structure and beta-diketone structure.

The catalyst additive may further comprise (iii) a tertiary amine. Suitable examples include dimethylcyclohexylamine, diethylcyclohexylamine, dimethylethanolamine, dimethylethanolamine ether, N-methylpiperidine, 1,4-diazabicyclo[2.2.2]octane, and/or triethylamine.

When used, the tertiary amine (iii) is present in the curable film-forming composition in an amount ranging from 0.4 to 2.5 percent by weight, such as at least 0.4 percent by weight, or at least 1.11 percent by weight, to at most 2.5 percent by weight, or at most 2 percent by weight, based on the total weight of resin solids in the composition. Often, the molar ratio of catalytic organic compound (i) to tertiary amine (iii) ranges from 0.05 to 0.10; more often 0.07 to 0.10. The amount of tertiary amine strongly depends on the NCO:OH index, resin structure and amine structure.

It is believed that the inclusion of the tertiary amine (iii) in the catalyst additive allows the curable film-forming compositions of the present invention to demonstrate accelerated cure times (for example, four hour or less) without decreasing pot life, as shown in the examples below. The span of time during which a coating composition is ready to apply to a substrate and is still of low enough viscosity to be applied; i. e., the period of time between when the components are mixed to form the curable composition and when the curable composition can no longer be reasonably applied to a surface for its intended purpose is commonly referred to as the working time, or "pot life." Quantitatively, the time it takes for the viscosity of a composition to double from the initial viscosity is reported as "pot life".

The film-forming component (a) may further comprise at least one film-forming polymer that is different from the polyisocyanate, having functional groups reactive with the isocyanate groups in polyisocyanate. Each polymer typically has multiple functional groups that may be pendant and/or terminal. Such functional groups include hydroxyl, thiol, and/or amine functional groups. The term "reactive" refers to a functional group capable of undergoing a chemical reaction with itself and/or other functional groups spontaneously or upon the application of heat or in the presence of a catalyst or by any other means known to those skilled in the art.

The film-forming compound may comprise a hydroxyl functional addition polymer, polyester polymer, polyurethane polymer, and/or polyether polymer. By "polymer" is meant a polymer including homopolymers and copolymers, and oligomers. By "composite material" is meant a combination of two or more different materials.

Often an acrylic polymer and/or polyester polymer having multiple hydroxyl functional groups is used. Note that the phrase "and/or" when used in a list is meant to encompass alternative embodiments including each individual component in the list as well as any combination of components. For example, the list "A, B, and/or C" is meant to encompass seven separate embodiments that include A, or B, or C, or A+B, or A+C, or B+C, or A+B+C.

Suitable addition polymers include copolymers of one or more ethylenically unsaturated monomers such as alkyl esters of acrylic acid or methacrylic acid, optionally together with one or more other polymerizable ethylenically unsaturated monomers. Useful alkyl esters of acrylic acid or methacrylic acid include aliphatic alkyl esters containing from 1 to 30, and usually 4 to 18 carbon atoms in the alkyl group. Non-limiting examples include methyl methacrylate, ethyl methacrylate, butyl methacrylate, ethyl acrylate, butyl acrylate, and 2-ethyl hexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

The acrylic copolymer may include hydroxyl functional groups, which are often incorporated into the polymer by including one or more hydroxyl functional monomers in the reactants used to produce the copolymer. Useful hydroxyl functional monomers include hydroxyalkyl acrylates and methacrylates, typically having 2 to 4 carbon atoms in the hydroxyalkyl group, such as hydroxyethyl acrylate, hydroxypropyl acrylate, 4-hydroxybutyl acrylate, hydroxy functional adducts of caprolactone and hydroxyalkyl acrylates, and corresponding methacrylates, as well as the beta-hydroxy ester functional monomers described below.

Beta-hydroxy ester functional monomers can be prepared from ethylenically unsaturated, epoxy functional monomers and carboxylic acids having from about 5 to about 20 carbon atoms, or from ethylenically unsaturated acid functional monomers and epoxy compounds containing at least 5 carbon atoms which are not polymerizable with the ethylenically unsaturated acid functional monomer.

Useful ethylenically unsaturated, epoxy functional monomers used to prepare the beta-hydroxy ester functional monomers include, but are not limited to, glycidyl acrylate, glycidyl methacrylate, allyl glycidyl ether, methallyl glycidyl ether, 1:1 (molar) adducts of ethylenically unsaturated monoisocyanates with hydroxy functional monoepoxides such as glycidol, and glycidyl esters of polymerizable polycarboxylic acids such as maleic acid. Glycidyl acrylate and glycidyl methacrylate are particularly suitable. Examples of carboxylic acids include, but are not limited to, saturated monocarboxylic acids such as isostearic acid and aromatic unsaturated carboxylic acids.

Useful ethylenically unsaturated acid functional monomers used to prepare the beta-hydroxy ester functional monomers include monocarboxylic acids such as acrylic acid, methacrylic acid, crotonic acid; dicarboxylic acids such as itaconic acid, maleic acid and fumaric acid; and monoesters of dicarboxylic acids such as monobutyl maleate and monobutyl itaconate. The ethylenically unsaturated acid functional monomer and epoxy compound are typically reacted in a 1:1 equivalent ratio. The epoxy compound does not contain ethylenic unsaturation that would participate in free radical-initiated polymerization with the unsaturated acid functional monomer. Useful epoxy compounds include 1,2-pentene oxide, styrene oxide and glycidyl esters or ethers, usually containing from 6 to 30 carbon atoms, such as butyl glycidyl ether, octyl glycidyl ether, phenyl glycidyl ether and para-(tertiary butyl) phenyl glycidyl ether. Common glycidyl esters include those of the structure:

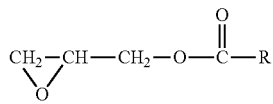

where R is a hydrocarbon radical containing from about 4 to about 26 carbon atoms. Usually, R is a branched hydrocarbon group having from about 4 to about 10 carbon atoms, such as neopentanoate, neoheptanoate or neodecanoate. Suitable glycidyl esters of carboxylic acids include VERSATIC ACID 911 and CARDURA E, each of which is commercially available from Shell Chemical Co.

In certain examples of the present invention, the polymer used in the curable film-forming composition comprises a fluorinated polymer. Nonlimiting examples of suitable fluoropolymers include fluoroethylene-alkyl vinyl ether alternating copolymers (such as those described in U.S. Pat. No. 4,345,057) available from Asahi Glass Company under the name LUMIFLON; fluoroaliphatic polymeric esters commercially available from 3M of St. Paul, Minn. under the name FLUORAD; and perfluorinated hydroxyl functional (meth)acrylate resins.

A polyester polymer may be used in the film-forming component (a). Such polymers may be prepared in a known manner by condensation of polyhydric alcohols and polycarboxylic acids. Suitable polyhydric alcohols include, but are not limited to, ethylene glycol, propylene glycol, butylene glycol, 1,6-hexylene glycol, neopentyl glycol, diethylene glycol, glycerol, trimethylol propane, and pentaerythritol. Suitable polycarboxylic acids include, but are not limited to, succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the acids such as anhydrides where they exist or lower alkyl (i. e., $C_1$ to $C_6$) esters of the acids such as the methyl esters may be used. Polyesters derived from cyclic esters such as caprolactone are also suitable.

Polyurethanes can also be used in the film-forming component (a). Among the polyurethanes which can be used are polymeric polyols which generally are prepared by reacting the polyester polyols or acrylic polyols such as those mentioned above with a polyisocyanate such that the OH/NCO equivalent ratio is greater than 1:1 so that free hydroxyl groups are present in the product. The organic polyisocyanate which is used to prepare the polyurethane polyol can be an aliphatic or an aromatic polyisocyanate or a mixture of the two. Diisocyanates are used often, although higher polyisocyanates can be used in place of or in combination with diisocyanates. Examples of suitable aromatic diisocyanates are 4,4'-diphenylmethane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed. Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate. As with the polyesters, the polyurethanes can be prepared with unreacted carboxylic acid groups, which upon neutralization with bases such as amines allows for dispersion into aqueous medium.

Examples of polyether polyols that may be used as the film-forming compound (b) are polyalkylene ether polyols which include those having the following structural formula:

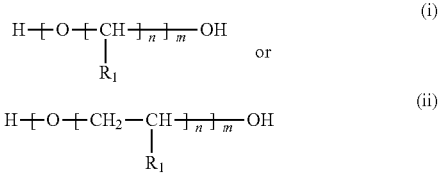

where the substituent $R_1$ is, independently for each occurrence, hydrogen or lower alkyl containing from 1 to 5 carbon atoms, and n is typically from 2 to 6 and m is from 8 to 100 or higher. Included are poly(oxytetramethylene) glycols, poly(oxytetraethylene) glycols, poly(oxy-1,2-propylene) glycols, and poly(oxy-1,2-butylene) glycols.

Also useful are polyether polyols formed from oxyalkylation of various polyols, for example, diols such as ethylene glycol, 1,6-hexanediol, Bisphenol A and the like, or other higher polyols such as trimethylolpropane, pentaerythritol, and the like. Polyols of higher functionality which can be utilized as indicated can be made, for instance, by oxyalkylation of compounds such as sucrose or sorbitol. One commonly utilized oxyalkylation method is reaction of a polyol with an alkylene oxide, for example, propylene or ethylene oxide, in the presence of an acidic or basic catalyst. Particular polyethers include those sold under the names TERATHANE and TERACOL, available from E. I. Du Pont de Nemours and Company, Inc., and POLYMEG, available from Q O Chemicals, Inc., a subsidiary of Great Lakes Chemical Corp.

Useful amine functional film-forming polymers such as polyoxypropylene amines commercially available under the trademark designation JEFFAMINE®; amine functional acrylic polymers and polyester polymers prepared as known in the art are also suitable.

When used, the film-forming polymer that is different from the polyisocyanate is present in the film-forming compositions in an amount ranging from at least 5 percent by weight, such as at least 20 percent by weight, or at least 30 percent by weight, to at most 90 percent by weight, or at most 60 percent by weight, based on the total weight of resin solids in the composition; and the polyisocyanate is present in the curable film-forming compositions in an amount ranging from 10 to 95 percent by weight, such as at least 40 percent by weight, or at least 50 percent by weight, and at most 90 percent by weight, or at most 70 percent by weight, based on the total weight of resin solids in the composition.

The polyisocyanate is used in relative stoichiometric excess to the film-forming polymer in the curable film-forming composition. For example, the equivalent ratio of isocyanate groups in the curing agent to functional groups in the film-forming polymer may be greater than 2:1, such as at least 3:1, often at least 5:1. The curable film-forming compositions of the present invention are suitable for use as CARCs, and the relatively high equivalent ratio of isocyanate groups in the curing agent to functional groups in the film-forming compound contributes to the chemical resistance of cured films formed from the curable film-forming compositions due to a high crosslink density in the film.

The curable film-forming compositions may be prepared as one-package systems, or multi-package systems when an additional film-forming polymer is present. For ambient cure coatings, it is not practical to store them as a one-package, but rather they must be stored as multi-package coatings to prevent the components from curing prior to use. The term "multi-package coatings" means coatings in which various components are maintained separately until just prior to application. In a typical two-package coating, the polyisocyanate is in a first package and the film-forming polymer is in the second package.

Each component of the catalyst additive (b) may be added to the curable film-forming compositions individually, or as a catalytic package containing both (or all three, when a tertiary amine is included) components, or they may be added singly or in various combinations to the first and/or second package. Thus when the composition is a two-package composition, each component of the catalyst additive (b) may be independently present with the polyisocyanate in a first package and/or with the film-forming polymer in a second package.

The aqueous curable film-forming compositions of the present invention may further comprise a miscible solvent. Examples of suitable solvents include alcohols such as 3-butoxypropan-2-ol and 1-propanol; ketones such as acetone, 2,6-dimethylheptan-4-one, 4,6-dimethylheptan-2-one, and heptan-2-one, and esters such as 1(or 2)-(2-methoxymethylethoxy) acetate, ethyl acetate, butyl acetate, and 2-methoxy-1-methylethyl acetate. Mixtures of solvent may also be used. When the solvent is present, it may be provided as a separate package and/or combined with either or both of the other two packages. Different solvents may be present in different packages for stability purposes.

The film-forming compositions of the present invention may further comprise a filler. Examples of fillers that can be present include finely divided minerals such as barium sulfate, silica, including fumed silica and colloidal silica, alumina, colloidal alumina, titanium dioxide, zirconia, colloidal zirconia, clay, mica, dolomite, talc, magnesium carbonate, calcium carbonate, calcium sulfate, calcium silicate, and/or calcium metasilicate.

The film-forming composition can additionally include a variety of optional ingredients and/or additives that are somewhat dependent on the particular application of the curable composition, such as pigments or other colorants, reinforcing additives, thixotropes, accelerators, surfactants, plasticizers, extenders, stabilizers, corrosion inhibitors, diluents, hindered amine light stabilizers, UV light absorbers, and antioxidants. The curable film-forming composition may be a color coat or clear coat; it may be opaque, translucent, tinted transparent, or colorless transparent.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

Example special effect compositions that may be used in the coatings of the present invention include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as reflectivity, opacity or texture. In a non-limiting embodiment, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

In certain non-limiting examples, a photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. In one non-limiting example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with a non-limiting embodiment of the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

In general, the colorant can be present in the compositions of the present invention in any amount sufficient to impart the desired property, visual and/or color effect. The colorant may comprise from 1 to 65 weight percent of the present compositions, such as from 3 to 40 weight percent or 5 to 35 weight percent, with weight percent based on the total weight of the compositions.

The curable film-forming compositions of the present invention may be used as coatings on substrates. As such, they form continuous films on a substrate that are free of voids or cells such as would be present in a foam. Thus the present invention is further drawn to a coated article comprising: (A) a substrate having at least one coatable surface; and (B) a cured coating layer applied on at least one surface of the substrate to form a coated substrate. The cured coating layer is prepared from any of the aqueous curable film-forming compositions described above. The coated article may comprise an aircraft or military vehicle such as a military aircraft or land vehicle.

Suitable substrates include rigid metal substrates such as ferrous metals, aluminum, aluminum alloys, copper, and other metal and alloy substrates. The ferrous metal substrates used in the practice of the present invention may include iron, steel, and alloys thereof. Non-limiting examples of useful steel materials include cold rolled steel, galvanized (zinc coated) steel, electrogalvanized steel, stainless steel, pickled steel, zinc-iron alloy such as GALVANNEAL, and combinations thereof. Combinations or composites of ferrous and non-ferrous metals can also be used. In certain examples of the present invention, the substrate comprises a composite material such as a plastic or a fiberglass composite. Often the substrates are used in turbines and aircraft parts such as airfoils, wings, stabilizers, rudders, ailerons, engine inlets, propellers, rotors, fuselage and the like.

Before depositing any coating compositions upon the surface of the substrate, it is common practice, though not necessary, to remove foreign matter from the surface by thoroughly cleaning and degreasing the surface. Such cleaning typically takes place after forming the substrate (stamping, welding, etc.) into an end-use shape. The surface of the substrate can be cleaned by physical or chemical means, such as mechanically abrading the surface or cleaning/degreasing with commercially available alkaline or acidic cleaning agents that are well known to those skilled in the art, such as sodium metasilicate and sodium hydroxide. A non-limiting example of a cleaning agent is CHEMKLEEN 163, an alkaline-based cleaner commercially available from PPG Industries, Inc.

Following the cleaning step, the substrate may be rinsed with deionized water, with a solvent, or an aqueous solution of rinsing agents in order to remove any residue. The substrate can be air dried, for example, by using an air knife, by flashing off the water by brief exposure of the substrate to a high temperature or by passing the substrate between squeegee rolls.

The substrate may be a bare, cleaned surface; it may be oily, pretreated with one or more pretreatment compositions, and/or prepainted with one or more coating compositions, primers, topcoats, etc., applied by any method including, but not limited to, electrodeposition, spraying, dip coating, roll coating, curtain coating, and the like.

The curable film-forming composition is applied to at least one surface of the substrate. A substrate may have one continuous surface, or two or more surfaces such as two opposing surfaces.

The compositions may be applied to the substrate by one or more of a number of methods including spraying, dipping/immersion, brushing, or flow coating, but they are most often applied by spraying. The usual spray techniques and equipment for air spraying and electrostatic spraying and either manual or automatic methods can be used. The coating layer typically has a dry film thickness of 1-5 mils (25.4-127 microns), often 1-3 mils (25.4-76.2 microns).

The film-forming compositions can be applied directly to the surface of the substrate or onto a primer coat or other coating, such as an electrocoat or topcoat, on the substrate. Suitable primers include, for example, commercially available aerospace compliant primers such as high solids epoxy primers. Multiple coating layers such as a primer and a colored base coat may be applied to the substrate prior to application of the curable film-forming composition of the present invention.

The compositions may be applied to a substrate as a monocoat or they may be part of a multi-layer coating composite comprising a substrate with various coating layers applied thereto. As such, they may be used as a pretreatment layer, primer, base coat and/or clear coat. At least one of the base coat and clear coat may contain colorant.

The present invention further provides a method of controlling the rate of cure of an aqueous curable film-forming composition. The method comprises adding to the aqueous curable film-forming composition a catalyst additive comprising:
  (i) a catalytic organic compound comprising iron and/or tin, such as any of those disclosed above; and
  (ii) a beta-diketone such as any of those disclosed above.
The catalyst additive may further comprise a tertiary amine as noted above. The curable film-forming composition comprises a film-forming component comprising an aliphatic di- or higher functional polyisocyanate. The film-forming component may further comprise a film-forming polymer as described above.

The polyisocyanate and film-forming polymer may be any of those discussed above. The equivalent ratio of isocyanate groups in the polyisocyanate to the reactive functional groups in the polymer is usually greater than 2:1, such as at least 3:1. Additionally, the curable film-forming composition may be essentially free of the film-forming polymer, containing only polyisocyanate.

After adding the catalyst additive to the aqueous curable film-forming composition, the methods may further comprise applying the curable film-forming composition to a substrate to form a coated substrate; and exposing the coated substrate to conditions for a time sufficient to at least partially cure the curable film-forming composition. The composition can be cured by allowing it to stand at ambient temperature, or a combination of ambient temperature cure and baking, or by baking alone. By "ambient" conditions is meant without the application of heat or other energy; for example, when a curable composition undergoes a thermosetting reaction without baking in an oven, use of forced air, irradiation, or the like to prompt the reaction, the reaction is said to occur under ambient conditions. Usually ambient temperature ranges from 60 to 90° F. (15.6 to 32.2° C.), such as a typical room temperature, 72° F. (22.2° C.). The composition will typically cure under ambient conditions in less than 5 hours. The composition can also be cured by baking at temperatures above 90° F. (32.2° C.), such as from 100 to 160° F. (37.8 to 71.1° C.) for a period from 15 min to 3 hours or a combination of ambient cure and baking. Alternatively, the coated substrate may be exposed to actinic radiation for a time sufficient to at least partially cure the curable film-forming composition. Typical actinic radiation conditions are 315 to 400 nm (UVA) at an irradiation intensity of 1 to 100 mW/cm$^2$ with a total UV dose from 0.5 to 10 J/cm$^2$. The composition will typically cure in less than 2 hours after the exposure to actinic radiation.

Each of the characteristics and examples described above, and combinations thereof, may be said to be encompassed by the present invention. The present invention is thus drawn to the following nonlimiting aspects:

1. A curable, aqueous film-forming composition comprising:
  (a) a film-forming component comprising an aliphatic di- or higher functional polyisocyanate; and
  (b) a catalyst additive comprising:
    (i) a catalytic organic compound comprising iron and/or tin; and
    (ii) a beta-diketone.

2. The curable film-forming composition according to aspect 1, wherein the polyisocyanate has an average isocyanate functionality greater than two.

3. The curable film-forming composition according to any of aspects 1 to 2, wherein the film-forming component (a) further comprises a film-forming polymer that is different from the polyisocyanate, comprising functional groups reactive with isocyanate functional groups in the polyisocyanate.

4. The curable film-forming composition according to aspect 3, wherein the film-forming polymer comprises an acrylic polymeric polyol, a polyether polymeric polyol, and/or a polyester polymeric polyol.

5. The curable film-forming composition according to any of aspects 3 to 4, wherein the equivalent ratio of isocyanate groups in the polyisocyanate to the reactive functional groups in the film-forming polymer is higher than 2:1.

6. The curable film-forming composition according to aspect 5, wherein the equivalent ratio of isocyanate groups in the polyisocyanate to the reactive functional groups in the film-forming polymer is at least 5:1.

7. The curable film-forming composition according to any of aspects 1 to 6, wherein the catalyst additive (b) comprises (iii) a tertiary amine.

8. The curable film-forming composition according to aspect 7, wherein the tertiary amine (iii) comprises dimethylcyclohexylamine, diethylcyclohexylamine, dimethylethanolamine, dimethylethanolamine ether, N-methylpiperidine, 1,4-diazabicyclo[2.2.2]octane, and/or triethylamine.

9. The curable film-forming composition according to any of aspects 7 to 8, wherein the molar ratio of catalytic organic compound (i) to tertiary amine (iii) is 0.05.

10. The curable film-forming composition according to any of aspects 1 to 9, wherein the catalytic organic compound (i) comprises ferric acetylacetonate and/or dibutyltin dilaurate.

11. The curable film-forming composition according to any of aspects 1 to 10, wherein the catalytic organic compound (i) is present in the curable film-forming composition in an amount of 0.10 to 0.8 percent by weight, based on the total weight of resin solids in the curable film-forming composition.

12. The curable film-forming composition according to any of aspects 1 to 11, wherein the beta-diketone (ii) comprises 2,4-pentanedione and/or 3-methyl-2,4-pentanedione.

13. The curable film-forming composition according to any of aspects 1 to 12, wherein the beta-diketone (ii) is present in the curable film-forming composition in an amount of 4 to 50 percent by weight, based on the total weight of resin solids in the curable film-forming composition.

14. The curable film-forming composition according to any of aspects 3 to 6, wherein the composition is a two-package composition, and each component of the catalyst additive (b) is independently present with the polyisocyanate in a first package and/or with the film-forming polymer in a second package.

15. A chemical agent resistant coating formed from the curable film-forming composition according to any of aspects 1 to 14.

16. A method of controlling the rate of cure of a curable film-forming composition, comprising adding to the curable film-forming composition a catalyst additive comprising:
   (i) a catalytic organic compound comprising iron and/or tin; and
   (ii) a beta-diketone;
wherein the aqueous curable film-forming composition comprises a film-forming component comprising an aliphatic di- or higher functional polyisocyanate.

17. The method according to aspect 16, wherein the film-forming component further comprises a film-forming polymer that is different from the polyisocyanate, comprising functional groups reactive with isocyanate functional groups in the polyisocyanate.

18. The method according to any of aspects 16 to 17, wherein the film-forming polymer comprises an acrylic polymeric polyol, a polyether polymeric polyol, and/or a polyester polymeric polyol.

19. The method according to aspect 18, wherein the equivalent ratio of isocyanate groups in the polyisocyanate to the reactive functional groups in the film-forming polymer is higher than 2:1.

20. The method according to aspect 19, wherein the equivalent ratio of isocyanate groups in the polyisocyanate to the reactive functional groups in the film-forming polymer at least 5:1.

21. The method according to any of aspects 16 to 20 wherein the catalytic organic compound (i) comprises ferric acetylacetonate or dibutyltin dilaurate.

22. The method according to any of aspects 16 to 21, wherein the catalyst additive further comprises (iii) a tertiary amine.

23. The method according to aspect 22, wherein the tertiary amine (iii) comprises dimethylcyclohexylamine, diethylcyclohexylamine, dimethylethanolamine, dimethylethanolamine ether, N-methylpiperidine, 1,4-diazabicyclo[2.2.2]octane, and/or triethylamine.

24. The method according to any of aspects 22 to 23, wherein the molar ratio of catalytic organic compound (i) to tertiary amine (iii) is 0.05.

25. The method according to any of aspects 16 to 24, wherein the catalytic organic compound (i) comprises ferric acetylacetonate and/or dibutyltin dilaurate.

26. The method according to any of aspects 16 to 25, wherein the catalytic organic compound (i) is present in the curable film-forming composition in an amount of 0.10 to 0.8 percent by weight, based on the total weight of resin solids in the curable film-forming composition.

27. The method according to any of aspects 16 to 26, wherein the beta-diketone (ii) comprises 2,4-pentanedione and/or 3-methyl-2,4-pentanedione.

28. A coated article comprising:
   (A) a substrate having at least one coatable surface; and
   (B) a cured coating layer applied on at least one surface of the substrate to form a coated substrate; wherein the cured coating layer is prepared from the aqueous curable film-forming composition according to any of aspects 1 to 15.

29. The coated article according to aspect 28, wherein a primer coating layer is applied to the surface of the substrate prior to the application of the aqueous curable film-forming composition.

30. The coated article according to any of aspects 28 to 29, wherein said coated article comprises an aircraft or military land vehicle.

The following examples are intended to illustrate various aspects of the invention, and should not be construed as limiting the invention in any way.

EXAMPLES

The various examples of the present invention as presented herein are each understood to be non-limiting with respect to the scope of the invention.

Equipment and Testing Methods

Pot Life Indicator Ratio:

Fresh-mixed and 4-hour viscosity of the coatings were measured with Brookfield viscometer DV-I Prime with RV spindle set (#3 spindle, 100 RPM, 23° C.) and reported as the Pot Life Indicator Ratio ((4 h measured viscosity)/(initial measured viscosity)). Pot life is defined as the amount of time it takes for the initial viscosity to double. For army applications, it is recommended to have four hours of pot life; thus a Pot Life Indicator Ratio of 2 or less is acceptable for this specification.

Coating Application Procedure:

The coating was applied via drawdown at a 6 mil wet film thickness using a BYK drawdown bar in ambient conditions (25° C. for Examples 1-13; 20° C. for Examples 14-16) on ACT CRS 04X12 X 032 C700 C59 Immersion DIW unpolished ED-6564 panels.

MEK Resistance

Solvent resistance was determined in accordance with ASTM D5402 (2015) by using a gauze cloth that was saturated with MEK solvent. MEK double rubs were recorded at the point when noticeable scratches/film break were observed. If no noticeable scratches were observed after 100 MEK double rubs, the result was recorded as 100 MEK dr. For this invention, efficiency of accelerated curing of the coating with the addition of new catalyst composition to the polyurethane coating was determined with MEK double rubs after exposure to ambient conditions.

The raw materials used in the example formulations are described and summarized in the following table:

| Raw Materials | Description | Supplier |
|---|---|---|
| Bayhydrol XP 7110E | Polyester polyol | Covestro |
| Pangel S-9 | Thixotropic agent | Tolsa Group |
| deionized water | solvent | PPG |
| Solsperse 20000 | Polymeric dispersant | Lubrizol Corporation |
| Pergopak M3 | Matting agent | PPG |
| BYK 023 | Defoamer | BYK Additives and Instruments |
| R-960 titanium dioxide | White pigment | E. I. Du Pont de Nemours |
| Poly Emulsion 392N35 | Emulsion | BYK Additives and Instruments |
| Silquest A-189 | Reinforcing agent | Momentive Performance Materials, Inc. |
| Tego Glide 100 | Flow additive | Evonik Industries |
| Quaker color AB-91F | Urethane dispersion | Quaker Color |
| Polyisocyanate (SW V93V502) | Polyisocyanate | Sherwin Williams |
| Fe(acac)₃ | catalyst | Sigma-Aldrich Co., LLC |
| DBTDL | catalyst | Songwon Industrial Co., Ltd. |
| 2,4-pentanedione | solvent | Sigma-Aldrich Co., LLC |
| N,N-dimethylcyclohexylamine | catalyst | Sigma-Aldrich Co., LLC |
| Methyl Amyl Ketone | solvent | Eastman Chemical Company |

Example Formulations

The compositions for each example were prepared from the ingredients listed in the following tables. Each contains a polyol with equivalent weight 880 g/eq and polyisocyanate derived from HDI with equivalent weight 297 g/eq. The equivalent ratio (or index) of polyisocyanate to polyol is tested at 3 (examples 12 and 13), 5 (examples 10 and 11), 10 (examples 1-7 and 4-16), and 15 (examples 8 and 9). Part A of the coating is formulated to 9.17 lb/gal for a CARC application and a solid content of 37% as determined by measuring weight loss of a sample after holding for 1 hour at 110° C.

| Raw Materials | Ex. 1 Wt (g) | Ex. 2 Wt (g) | Ex. 3 Wt (g) | Ex. 4 Wt (g) | Ex. 5 Wt (g) | Ex. 6 Wt (g) | Ex. 7 Wt (g) |
|---|---|---|---|---|---|---|---|
| Part A | | | | | | | |
| Bayhydrol XP 7110E | 24.4 | 24.4 | 24.4 | 24.4 | 24.4 | 24.4 | 24.4 |
| Pangel S-9 | 0.56 | 0.56 | 0.56 | 0.56 | 0.56 | 0.56 | 0.56 |
| deionized water | 21.86 | 21.86 | 21.86 | 21.86 | 21.86 | 21.86 | 21.86 |
| Solsperse 20000 | 0.31 | 0.31 | 0.31 | 0.31 | 0.31 | 0.31 | 0.31 |
| Pergopak M3 | 7.05 | 7.05 | 7.05 | 7.05 | 7.05 | 7.05 | 7.05 |
| BYK 023 | 0.18 | 0.18 | 0.18 | 0.18 | 0.18 | 0.18 | 0.18 |
| R-960 titanium dioxide | 3.66 | 3.66 | 3.66 | 3.66 | 3.66 | 3.66 | 3.66 |
| Poly Emulsion 392N35 | 5.29 | 5.29 | 5.29 | 5.29 | 5.29 | 5.29 | 5.29 |
| Silquest A-189 | 1.97 | 1.97 | 1.97 | 1.97 | 1.97 | 1.97 | 1.97 |
| Tego Glide 100 | 0.2 | 0.2 | 0.2 | 0.2 | 0.2 | 0.2 | 0.2 |
| Quaker color AB-91F | 2.49 | 2.49 | 2.49 | 2.49 | 2.49 | 2.49 | 2.49 |
| Part B | | | | | | | |
| Polyisocyanate (SW V93V502) | 32 | 32 | 32 | 32 | 32 | 32 | 32 |
| Post-Add | | | | | | | |
| Deionized water | 27 | 27 | 27 | 27 | 27 | 27 | 27 |
| Catalyst | | | | | | | |
| Fe(acac)₃ | — | 0.075 | 0.075 | — | — | 0.075 | 0.075 |
| 2,4-pentanedione | — | 2 | 2 | — | 2 | — | — |
| N,N-dimethylcyclohexylamine | — | — | 0.375 | 0.375 | 0.375 | — | 0.375 |
| Methyl Amyl Ketone | — | — | — | — | — | 2 | 2 |
| Total | 126.97 | 129.05 | 129.43 | 127.35 | 129.35 | 129.05 | 129.43 |
| Properties of Examples 1 to 7 | | | | | | | |
| MEK double rubs (dr) after 6 hrs | 4 | >100 | >100 | 9 | 6 | >100 | 24 |
| Time at 100 MEK dr | >8 hrs | 5 hrs | 3.5 hrs | >8 hrs | >8 hrs | 6 hrs | >8 hrs |
| Pot life Indicator ratio | 1.28 | 1.33 | 1.24 | 1.49 | 1.15 | Gelled at 4 hrs | Gelled at 4 hrs |

Example 1 is a control example demonstrating a polyurethane coating without catalyst. It showed no significant changes in viscosity over 4 hours and passed the 100 MEK double rubs at 24 hours.

Example 2 is an example demonstrating a polyurethane coating in accordance with the present invention formulated with 0.06% by weight based on total formulation of ferric acetylacetonate catalyst and 1.5% 2,4-pentanedione. It passed the 100 MEK double rubs at 5 hours with no significant changes in viscosity over 4 hours.

Example 3 is a polyurethane coating in accordance with the present invention, formulated with 0.06% by weight based on total formulation of ferric acetylacetonate catalyst combined with 0.3% N,N-dimethylcyclohexylamine and 1.5% 2,4-pentanedione. It passed the 100 MEK double rubs at 3.5 hours with no significant changes in viscosity over 4 hours.

Example 4 is a comparative example demonstrating a polyurethane coating formulated with 0.3% by weight based on total formulation of N,N-dimethylcyclohexylamine. It passed the 100 MEK double rubs at >8 hrs≤24 hrs with no significant changes in viscosity over 4 hours.

Example 5 is a comparative example demonstrating a polyurethane coating formulated with 0.3% by weight based on total formulation of N,N-dimethylcyclohexylamine combined with 1.5% 2,4-pentanedione. It passed the 100 MEK double rubs at >8 hrs≤24 hrs with no significant changes in viscosity over 4 hours.

Example 6 is a comparative example demonstrating a polyurethane coating formulated with 0.06% by weight based on total formulation of ferric acetylacetonate catalyst and 1.5% methyl ethyl ketone (MEK). It passed the 100 MEK double rubs in 6 hours, but it had very short pot life, gelling in less than 4 hours.

Example 7 is a comparative example demonstrating a polyurethane coating formulated with the ferric acetylacetonate catalyst combined with 0.3% by weight based on total formulation of N,N-dimethylcyclohexylamine and 1.5% methyl ethyl ketone. It passed the 100 MEK double rubs at >8 hrs≤24 hrs and it had very short pot life, gelling in less than 4 hours.

| Raw Materials | Example 8 | 9 | 10 | 11 | 12 | 13 |
|---|---|---|---|---|---|---|
| Part A | | | | | | |
| Bayhydrol XP7110E | 24.4 | 24.4 | 24.4 | 24.4 | 24.4 | 24.4 |
| Pangel S-9 | 0.56 | 0.56 | 0.56 | 0.56 | 0.56 | 0.56 |
| deionized water | 21.86 | 21.86 | 21.86 | 21.86 | 21.86 | 21.86 |
| Solsperse 20000 | 0.31 | 0.31 | 0.31 | 0.31 | 0.31 | 0.31 |
| Pergopak M3 | 7.05 | 7.05 | 7.05 | 7.05 | 7.05 | 7.05 |
| BYK 023 | 0.18 | 0.18 | 0.18 | 0.18 | 0.18 | 0.18 |
| R-960 titanium dioxide | 3.66 | 3.66 | 3.66 | 3.66 | 3.66 | 3.66 |
| poly emulsion 392N35 | 5.29 | 5.29 | 5.29 | 5.29 | 5.29 | 5.29 |
| Silquest A-189 | 1.97 | 1.97 | 1.97 | 1.97 | 1.97 | 1.97 |
| Tego Glide 100 | 0.2 | 0.2 | 0.2 | 0.2 | 0.2 | 0.2 |
| Quaker color AB-91F | 2.49 | 2.49 | 2.49 | 2.49 | 2.49 | 2.49 |
| Part B | | | | | | |
| Polyisocyanate (SW V93V502) | 48 | 48 | 16 | 16 | 9.6 | 9.6 |
| Catalyst | | | | | | |
| Fe(acac)$_3$ | — | 0.2 | — | 0.038 | — | 0.025 |
| 2,4-pentanedione | — | 5.3 | — | 1 | — | 0.7 |
| N,N-dimethylcyclohexylamine | — | 1 | — | 0.19 | — | 0.13 |
| Post-Add | | | | | | |
| Deionized water | 38 | 38 | 12 | 12 | 8.3 | 10 |
| Total | 154 | 160.5 | 96 | 97.2 | 86 | 88.5 |
| Properties of Examples 8 to 13 | | | | | | |
| MEK dr after 6 hrs | 6 | >100 | 20 | >100 | 10 | >100 |
| Time at 100 MEK dr | >6 hrs | 5 hrs | >6 hrs | 3.5 hrs | >7 hrs | 6 hrs |
| Pot life Indicator ratio | 1.28 | 1.19 | 1.2 | 1.18 | 1.12 | 1.7 |

Example 8 is a control example demonstrating a polyurethane coating without catalyst at NCO:OH index 15. It showed no significant changes in viscosity over 4 hours and passed the 100 MEK double rubs after 24 hours.

Example 9 is a polyurethane coating in accordance with the present invention at NCO:OH index 15 formulated with 0.12% by weight based on total formulation of ferric acetylacetonate catalyst, 0.6% N,N-dimethylcyclohexylamine and 3.3% 2,4-pentanedione. It passed the 100 MEK double rubs at 5 hours with no significant changes in viscosity over 4 hours.

Example 10 is a control example demonstrating a polyurethane coating without catalyst at NCO:OH index 5. It showed no significant changes in viscosity over 4 hours and passed the 100 MEK double rubs after 24 hours.

Example 11 is a polyurethane coating in accordance with the present invention at NCO:OH index 5 formulated with 0.04% by weight based on total formulation of ferric acetylacetonate catalyst, 0.2% N,N-dimethylcyclohexylamine and 1% 2,4-pentanedione. It passed the 100 MEK double rubs at 3.5 hours with no significant changes in viscosity over 4 hours.

Example 12 is a control example demonstrating a polyurethane coating without catalyst at NCO:OH index 3. It showed no significant changes in viscosity over 4 hours and passed the 100 MEK double rubs after 24 hours.

Example 13 is a polyurethane coating in accordance with the present invention at NCO:OH index 3, formulated with 0.028% by weight based on total formulation of ferric acetylacetonate catalyst, 0.15% N, N-dimethylcyclohexylamine and 0.8% 2,4-pentanedione. It passed the 100 MEK double rubs at 6 hours with no significant changes in viscosity over 4 hours.

| Raw Materials | Example 14 | Example 15 | Example 16 |
|---|---|---|---|
| Part A | | | |
| Bayhydrol XP 7110E | 24.4 | 24.4 | 24.4 |
| Pangel S-9 | 0.56 | 0.56 | 0.56 |
| deionized water | 21.86 | 21.86 | 21.86 |
| Solsperse 20000 | 0.31 | 0.31 | 0.31 |
| Pergopak M3 | 7.05 | 7.05 | 7.05 |
| BYK 023 | 0.18 | 0.18 | 0.18 |
| R-960 titanium dioxide | 3.66 | 3.66 | 3.66 |
| poly emulsion 392N35 | 5.29 | 5.29 | 5.29 |
| Silquest A-189 | 1.97 | 1.97 | 1.97 |
| Tego Glide 100 | 0.2 | 0.2 | 0.2 |
| Quaker color AB-91F | 2.49 | 2.49 | 2.49 |
| Part B | | | |
| Polyisocyanate (SW V93V502) | 32 | 32 | 32 |
| Catalyst | | | |
| DBTDL | 0.25 | 0.25 | 0.25 |
| 2,4-pentanedione | 12 | 12 | — |
| N,N-dimethylcyclohexylamine | 0.8 | — | — |
| Post-Add | | | |
| Deionized water | 28 | 28 | 28 |
| Total | 141.02 | 140.22 | 128.22 |
| Properties of Examples 14 to 16 | | | |
| MEK dr after 6 hrs | >100 | >100 | 20 |
| Time at 100 MEK dr | 3 hrs | 4.5 hrs | >6 hrs |
| Pot life Indicator ratio | 1.1 | 1.1 | gelled |

Example 14 is a polyurethane coating in accordance with the present invention formulated with 0.18% by weight based on total formulation of DBTDL catalyst combined with 0.57% N,N-dimethylcyclohexylamine and 8.5% 2,4-pentanedione. It passed the 100 MEK double rubs at 3 hours with no significant changes in viscosity over 4 hours.

Example 15 is an example demonstrating a polyurethane coating in accordance with the present invention formulated with 0.18% by weight based on total formulation of DBTDL catalyst combined with 8.5% 2,4-pentanedione. It passed the 100 MEK double rubs at 4.5 hours with no significant changes in viscosity over 4 hours.

Example 16 is a comparative example demonstrating a polyurethane coating formulated with 0.18% by weight based on total formulation of DBTDL catalyst. It passed the 100 MEK double rubs after 24 hours with a short pot life, gelling under 4 hours.

| Raw Materials | 17 | 18 | 19 | 20 | 21 | 22 |
|---|---|---|---|---|---|---|
| Part A | | | | | | |
| Bayhydrol XP 7110E | 0 | 0 | 0 | 0 | 0 | 0 |
| Pangel S-9 | 0.7 | 0.56 | 0.56 | 0 | 0 | 0 |
| deionized water | 41 | 21.86 | 21.86 | 0 | 0 | 0 |
| Solsperse 20000 | 0.4 | 0.31 | 0.31 | 0 | 0 | 0 |
| Pergopak M3 | 8.7 | 7.05 | 7.05 | 0 | 0 | 0 |
| BYK 023 | 0.2 | 0.18 | 0.18 | 0 | 0 | 0 |
| R-960 titanium dioxide | 4.5 | 3.66 | 3.66 | 0 | 0 | 0 |
| poly emulsion 392N35 | 6.5 | 5.29 | 5.29 | 0 | 0 | 0 |
| Silquest A-189 | 2.4 | 1.97 | 1.97 | 0 | 0 | 0 |
| Tego Glide 100 | 0.2 | 0.2 | 0.2 | 0 | 0 | 0 |
| Quaker color AB-91F | 3.1 | 2.49 | 2.49 | 0 | 0 | 0 |
| Part B | | | | | | |
| Polyisocyanate (SW V93V502) | 32 | 32 | 32 | 8 | 8 | 8 |
| Catalyst | | | | | | |
| Fe(acac)$_3$ | — | 0.23 | — | — | 0.15 | — |
| DBTDL | — | — | 0.46 | — | — | 0.15 |
| 2,4-pentanedione | — | 6 | 12 | — | 3 | 3 |
| Post-Add | | | | | | |
| Deionized water | 27 | 27 | 28 | 3.4 | 3.4 | 3.4 |
| Total | 126.75 | 132.98 | 139.21 | 11.4 | 14.55 | 14.55 |
| Properties of Examples 17 to 19 | | | | | | |
| Time at 100 MEK dr | After 1 week-0 | ~24 hrs | ~48 hrs | | 3 hrs | 6 hrs |
| Pot life Indicator ratio | 1.1 | 1.1 | 1.1 | | ND | ND |

Example 17 is a control example formulated without a polyol source in Part A or any components of the catalyst package. After one week no cure was observed with no significant changes in viscosity over 4 hours.

Example 18 is an example in accordance with the present invention, demonstrating the acceleration in cure of a film comprising a polyisocyanate in the absence of a polyol source in the formulation, formulated with 0.17% by weight based on total formulation of ferric acetylacetonate catalyst and 4.5% 2,4-pentanedione. It passed the 100 MEK double rubs at 24 hours with no significant changes in viscosity over 4 hours.

Example 19 is an example in accordance with the present invention, demonstrating the acceleration in cure of a film comprising a polyisocyanate in the absence of a polyol source in the formulation, formulated with 0.34% by weight based on total formulation of DBTDL catalyst and 9% 2,4-pentanedione. It passed the 100 MEK double rubs after 48 hours with no significant changes in viscosity over 4 hours.

Example 20 is a control example formulated without any components of the catalyst package. After 48 h no cure was observed.

Example 21 is an example in accordance with the present invention, demonstrating the acceleration in cure of a film comprising a polyisocyanate in the absence of a polyol source, formulated with 1% by weight based on total formulation of ferric acetylacetonate catalyst and 21% 2,4-pentanedione. It passed the 100 MEK double rubs at 3 hours.

Example 22 is an example in accordance with the present invention, demonstrating the acceleration in cure of a film comprising a polyisocyanate in the absence of a polyol source, formulated with 1% by weight based on total formulation of DBTDL catalyst and 21% 2,4-pentanedione. It passed the 100 MEK double rubs at 3 hours.

Whereas particular aspects of this invention have been described above for purposes of illustration, it will be evident to those skilled in the art that numerous variations of the details of the present invention may be made without departing from the scope of the invention as defined in the appended claims.

Therefore, we claim:

1. A curable, aqueous film-forming composition comprising:
    (a) a film-forming component comprising an aliphatic di- or higher functional polyisocyanate; and
    (b) a catalyst additive comprising:
        (i) a catalytic organic compound comprising iron; and
        (ii) a beta-diketone.
2. The curable film-forming composition of claim 1, wherein the polyisocyanate has an average isocyanate functionality greater than two.
3. The curable film-forming composition of claim 1, wherein the film-forming component (a) further comprises a film-forming polymer that is different from the polyisocyanate, comprising functional groups reactive with isocyanate functional groups in the polyisocyanate.
4. The curable film-forming composition of claim 3, wherein the film-forming polymer comprises an acrylic polymeric polyol, a polyether polymeric polyol, and/or a polyester polymeric polyol.
5. The curable film-forming composition of claim 3, wherein the equivalent ratio of isocyanate groups in the polyisocyanate to the reactive functional groups in the film-forming polymer is higher than 2:1.
6. The curable film-forming composition of claim 5, wherein the equivalent ratio of isocyanate groups in the polyisocyanate to the reactive functional groups in the film-forming polymer is at least 5:1.
7. The curable film-forming composition of claim 1, wherein the catalyst additive (b) further comprises (iii) a tertiary amine.
8. The curable film-forming composition of claim 7, wherein the tertiary amine (iii) comprises dimethylcyclohexylamine, diethylcyclohexylamine, dimethylethanolamine, a dimethylethanolamine ether, N-methylpiperidine, 1,4-diazabicyclo[2.2.2]octane, and/or triethylamine.
9. The curable film-forming composition of claim 7, wherein the molar ratio of catalytic organic compound (i) to tertiary amine (iii) ranges from 0.05 to 0.10.
10. The curable film-forming composition of claim 1, wherein the catalytic organic compound (i) comprises ferric acetylacetonate.
11. The curable film-forming composition of claim 1, wherein the catalytic organic compound (i) is present in the curable film-forming composition in an amount of 0.10 to 0.8 percent by weight, based on the total weight of resin solids in the curable film-forming composition.
12. The curable film-forming composition of claim 1, wherein the beta-diketone (ii) comprises 2,4-pentanedione and/or 3-methyl-2,4-pentanedione.
13. The curable film-forming composition of claim 1, wherein the beta-diketone (ii) is present in the curable film-forming composition in an amount of 4 to 50 percent by weight, based on the total weight of resin solids in the curable film-forming composition.
14. The curable film-forming composition of claim 3, wherein the composition is a two-package composition, and each component of the catalyst additive (b) is independently present with the polyisocyanate in a first package and/or with the film-forming polymer in a second package.
15. A chemical agent resistant coating formed from the curable film-forming composition of claim 3.
16. A method of controlling the rate of cure of an aqueous curable film-forming composition, comprising adding to the aqueous curable film-forming composition a catalyst additive comprising:
    (i) a catalytic organic compound comprising iron; and
    (ii) a beta-diketone;
    wherein the aqueous curable film-forming composition comprises a film-forming component comprising an aliphatic di- or higher functional polyisocyanate.
17. The method of claim 16, wherein the film-forming component further comprises a polymer that is different from the polyisocyanate, comprising functional groups reactive with isocyanate functional groups in the polyisocyanate.
18. The method of claim 16, wherein the catalytic organic compound (i) comprises ferric acetylacetonate.
19. The method of claim 16, wherein the catalyst additive further comprises (iii) a tertiary amine.
20. The method of claim 19, wherein tertiary amine (iii) comprises dimethylcyclohexylamine, dimethylethanolamine, and/or dimethylethanolamine ether.
21. The method of claim 16, wherein the beta-diketone (ii) comprises 2,4-pentanedione and/or 3-methyl-2,4-pentanedione.
22. A coated article comprising:
    (A) a substrate having at least one coatable surface; and
    (B) a cured coating layer applied on at least one surface of the substrate to form a coated substrate; wherein the cured coating layer is deposited from the aqueous curable film-forming composition of claim 1.
23. The coated article of claim 22, wherein a primer coating layer is applied to the surface of the substrate prior to the application of the aqueous curable film-forming composition.
24. The coated article of claim 22, wherein said coated article comprises an aircraft or military land vehicle.
25. A coated article comprising:
    (A) a substrate having at least one coatable surface; and
    (B) a cured coating layer applied on at least one surface of the substrate to form a coated substrate; wherein the cured coating layer is deposited from the aqueous curable film-forming composition of claim 3.

* * * * *